US012668285B2

(12) United States Patent
Vladimerou

(10) Patent No.: US 12,668,285 B2
(45) Date of Patent: Jun. 30, 2026

(54) DEVICES, SYSTEMS, AND METHODS FOR MINIMAL INPUT DRIVING

(71) Applicant: TOYOTA MOTOR ENGINEERING & MANUFACTURING NORTH AMERICA, INC., Plano, TX (US)

(72) Inventor: Vladimeros Vladimerou, Whitmore Lake, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 163 days.

(21) Appl. No.: 18/442,039

(22) Filed: Feb. 14, 2024

(65) Prior Publication Data

US 2025/0256743 A1 Aug. 14, 2025

(51) Int. Cl.
*B60W 60/00* (2020.01)
*B60W 30/06* (2006.01)
(Continued)

(52) U.S. Cl.
CPC ........ *B60W 60/0059* (2020.02); *B60W 30/06* (2013.01); *B60W 30/09* (2013.01);
(Continued)

(58) Field of Classification Search
CPC .. B60W 60/0059; B60W 30/06; B60W 30/09; B60W 30/0956; B60W 50/14;
(Continued)

(56) References Cited

U.S. PATENT DOCUMENTS 9,494,439 B1 11/2016 Ross et al.
10,101,742 B2 10/2018 Prokhorov
(Continued)

FOREIGN PATENT DOCUMENTS

CN 104417555 B * 6/2017 ............ B60W 10/04

OTHER PUBLICATIONS

Machine Translation of Chung's reference (CN-104417555-A) (Year: 2015).*

*Primary Examiner* — Tarek Elarabi
(74) *Attorney, Agent, or Firm* — HAYNES AND BOONE, LLP

(57) ABSTRACT

A system for controlling a vehicle includes a positioning sensor, an obstacle detection sensor, a lane detection sensor, and a smart cruise control system configured to control steering, braking, and acceleration of the vehicle, based on readings from the sensors, to follow a recorded route. The system also includes a processor configured to, with the sensors, record a route while a driver is controlling the vehicle. The processor is also configured to receive a first user input to follow the recorded route; for a first complexity of a roadway on which the vehicle is traveling, activate the smart cruise control system to follow the recorded route; and for a second complexity of the roadway: deactivate the smart cruise control system; control the braking of the vehicle; receive a second user input; and upon receiving the second user input, activate the smart cruise control system to follow the recorded route.

20 Claims, 9 Drawing Sheets

(51) Int. Cl.
*B60W 30/09* (2012.01)
*B60W 30/095* (2012.01)
*B60W 50/14* (2020.01)

(52) U.S. Cl.
CPC ........ *B60W 30/0956* (2013.01); *B60W 50/14*
(2013.01); *B60W 2050/146* (2013.01); *B60W*
*2420/403* (2013.01); *B60W 2420/408*
(2024.01); *B60W 2540/12* (2013.01)

(58) Field of Classification Search
CPC ..... B60W 2050/146; B60W 2420/403; B60W
2420/408; B60W 2540/12
See application file for complete search history.

(56) References Cited

U.S. PATENT DOCUMENTS

| | | | |
|---|---|---|---|
| 10,745,016 B2 * | 8/2020 | Bae ...................... | B60W 40/04 |
| 11,091,171 B2 | 8/2021 | Gordon et al. | |
| 11,754,408 B2 | 9/2023 | Seegmiller et al. | |
| 2019/0016340 A1 * | 1/2019 | Bae ................ | B60W 30/18109 |
| 2021/0070301 A1 | 3/2021 | Madimerou et al. | |

* cited by examiner

DEVICES, SYSTEMS, AND METHODS FOR MINIMAL INPUT DRIVING

TECHNICAL FIELD

The subject matter described herein relates to devices and methods for semi-autonomous driving of a motor vehicle. This technology has particular but not exclusive utility for cars and trucks.

BACKGROUND

Driving a motor vehicle requires simultaneous exercise of perception, judgement, and vehicle operation skills, which can be a cumbersome task that, for some individuals, is infeasible. Given an aging population, along with permanently or temporarily disabled drivers, mobility is a social issue as well as a technological one. At any given time, more than 12% of the population experiences mobility-related disabilities that impact driving ability, and in the United States, approximately 20% of drivers are over the age of 65 and may experience declines in driving ability.

Autonomous driving presents an opportunity for individuals with impaired driving ability to move between important locations, e.g., under the guidance of a navigation system that can plan a route between the start and end points of a journey. However, autonomous driving is computationally intensive and requires a suite of complex sensors. Thus, vehicles with full autonomous driving capability remain rare and expensive. Also, at the time of this writing, public trust in autonomous driving remains low; people do not trust autonomous driving systems to correctly interpret the diverse stimuli that occur on public roadways.

Thus, a need exists for improved mobility systems that address the foregoing and other concerns.

The information included in this Background section of the specification, including any references cited herein and any description or discussion thereof, is included for technical reference purposes only and is not to be regarded as limiting.

SUMMARY

The present disclosure provides a minimal input driving system that provides an autonomous driving capability on simple roads, but waits for driver input to proceed at turns and intersections. The minimal input driving system leverages the accelerator control, brake control, and lane-holding ability of smart cruise control systems such that the driver does not need to provide any input on low-topological-complexity roads, but leverages the perception and judgment capabilities of the human driver in the more complex environment found at turns and intersection. This allows for a low-cost autonomous driving capability that makes use of assistive driving hardware and software features already found in many modern vehicles.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for controlling a vehicle. The system includes a positioning sensor, an obstacle detection sensor, a lane detection sensor, and a smart cruise control system configured to control steering, braking, and acceleration of the vehicle, based on sensor readings from the positioning sensor, the obstacle detection sensor, and the lane detection sensor, to follow a recorded route. The system also includes a processor configured to: with the positioning sensor, obstacle detection sensor, and lane detection sensor, record a route while a driver is controlling the steering, braking, and acceleration of the vehicle; receive a first user input to follow the recorded route; for a first complexity of a roadway on which the vehicle is traveling, activate the smart cruise control system to follow the recorded route; and for a second complexity of the roadway on which the vehicle is traveling: deactivate the smart cruise control system; control the braking of the vehicle; receive a second user input; and upon receiving the second user input, activate the smart cruise control system to follow the recorded route. Other embodiments of this aspect include corresponding computer systems, apparatus, and computer programs recorded on one or more computer storage devices, each configured to perform the actions of the methods.

Implementations may include one or more of the following features. In some implementations, the first complexity may include an absence of a stop, turn, merge, or intersection within a threshold distance, and the second complexity may include a presence of a stop, turn, merge, or intersection within the threshold distance. In some implementations, the obstacle detection sensor may include a radar, lidar, or camera. In some implementations, the lane detection sensor may include a radar, lidar, or camera. In some implementations, following the recorded route may include: with the obstacle sensor, detecting an obstacle; and controlling the steering, braking, and acceleration of the vehicle to avoid the obstacle. In some implementations, the processor is further configured to generate a screen display that may include a representation of at least a portion of the recorded route. In some implementations, the processor is further configured to: receive a brake pedal user input; and upon receiving the brake pedal user input, deactivate the smart cruise control system. In some implementations, following the recorded route may include making at least one turn or lane change. In some implementations, following the recorded route may include parking the vehicle. In some implementations, the processor is further configured to combine a first portion of the recorded route with a second portion of a second recorded route to produce a third recorded route. Implementations of the described techniques may include hardware, a method or process, or computer software on a computer-accessible medium.

One general aspect includes a method for controlling a vehicle. The method includes, with a smart cruise control system, controlling steering, braking, and acceleration of the vehicle, based on sensor readings from a positioning sensor, an obstacle detection sensor, and a lane detection sensor, to follow a recorded route. The method also includes, with a processor: with the positioning sensor, obstacle detection sensor, and lane detection sensor, recording a route while a driver is controlling the steering, braking, and acceleration of the vehicle; receiving a first user input to follow the recorded route; for a first complexity of a roadway on which the vehicle is traveling, activating the smart cruise control system to follow the recorded route; and for a second complexity of the roadway on which the vehicle is traveling: deactivating the smart cruise control system; controlling the braking of the vehicle; receiving a second user input; and upon receiving the second user input, activating the smart cruise control system to follow the recorded route. Other implementations of this aspect include corresponding computer systems, apparatus, and computer programs recorded on one or more computer storage devices, each configured to perform the actions of the methods.

Implementations may include one or more of the following features. In some implementations, the first complexity may include an absence of a stop, turn, merge, or intersection within a threshold distance, and the second complexity may include a presence of a stop, turn, merge, or intersection within the threshold distance. In some implementations, the obstacle detection sensor or the lane detection sensor may include a radar, lidar, or camera. In some implementations, following the recorded route may include: with the obstacle sensor, detecting an obstacle; and controlling the steering, braking, and acceleration of the vehicle to avoid the obstacle. In some implementations, the method may include, with the processor, generating a screen display may include a representation of at least a portion of the recorded route. In some implementations, the method may include, with the processor: receiving a brake pedal user input; and upon receiving the brake pedal user input, deactivating the smart cruise control system. Implementations of the described techniques may include hardware, a method or process, or computer software on a computer-accessible medium.

One general aspect includes a system for controlling a vehicle. The system includes a positioning sensor, an obstacle detection sensor, a lane detection sensor, and a smart cruise control system configured to control steering, braking, and acceleration of the vehicle, based on sensor readings from the positioning sensor, the obstacle detection sensor, and the lane detection sensor, to follow a recorded route. The system also includes a processor configured to: with the positioning sensor, obstacle detection sensor, and lane detection sensor, record a route while a driver is controlling the steering, braking, and acceleration of the vehicle; receive a first user input to follow the recorded route; for a first complexity of a roadway on which the vehicle is traveling, activate the smart cruise control system to follow the recorded route; for a second complexity of the roadway on which the vehicle is traveling, requesting a driver to control at least one of the steering, braking or acceleration of the vehicle, where the second complexity is higher than the first complexity. Other embodiments of this aspect include corresponding computer systems, apparatus, and computer programs recorded on one or more computer storage devices, each configured to perform the actions of the methods.

Implementations may include one or more of the following features. In some implementations, the processor is further configured to, for the second complexity of the roadway on which the vehicle is traveling: control the braking of the vehicle; receive a second user input; and upon receiving the second user input, activate the smart cruise control system to follow the recorded route. In some implementations, for the first complexity of the roadway, the smart cruise control system controls steering, acceleration and braking of the vehicle. In some implementations, for the second complexity of the roadway, the smart cruise control system controls steering of the vehicle and instructs the user to control the acceleration and braking of the vehicle. Implementations of the described techniques may include hardware, a method or process, or computer software on a computer-accessible medium.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the minimal input driving system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
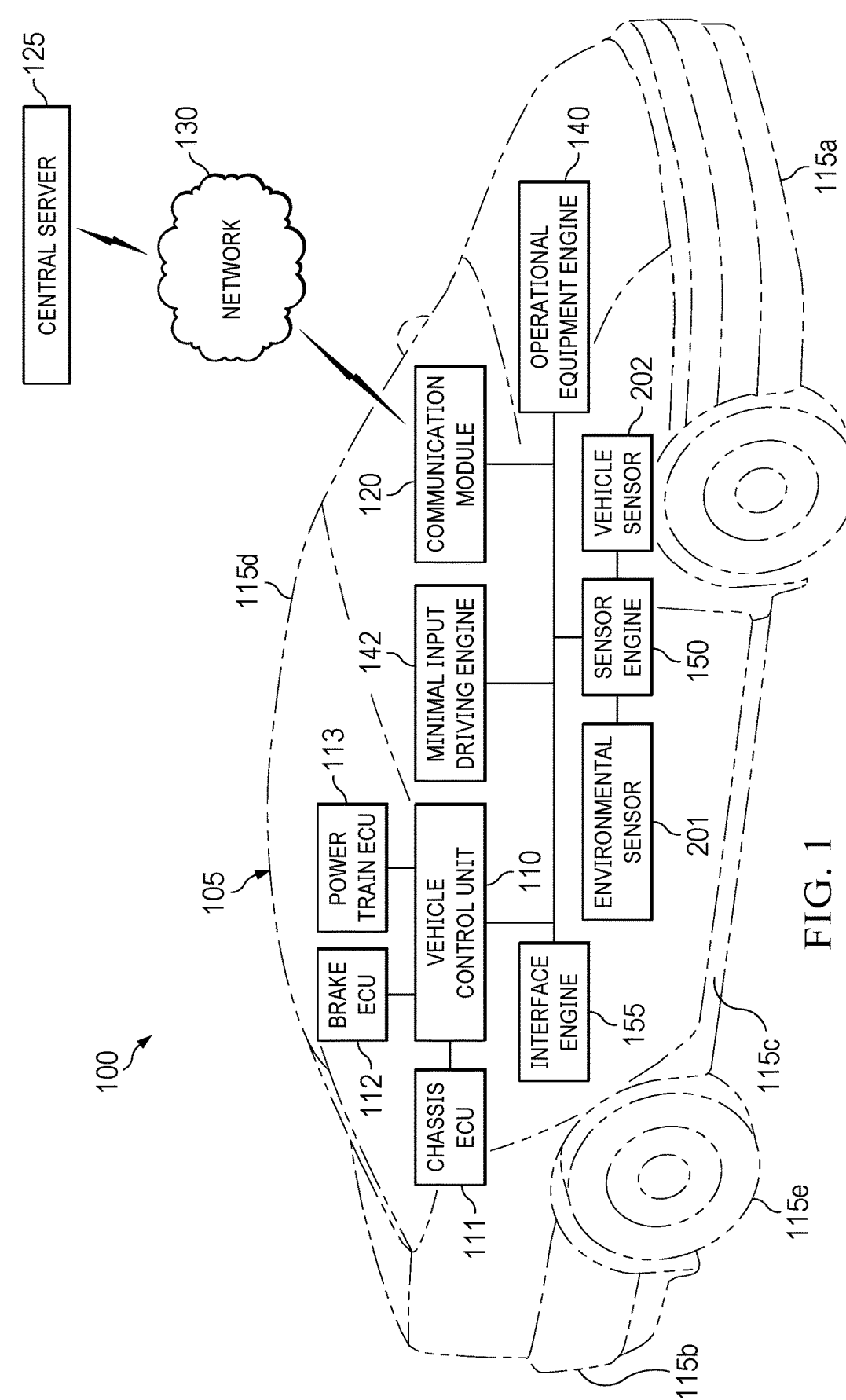
FIG. 1 is a diagrammatic illustration, in a block diagram form, of a minimal input driving system in accordance with at least one embodiment of the present disclosure.

In accordance with at least one embodiment of the present disclosure, a minimal input driving system is provided that uses recorded routes to travel between a point of origin and a pre-determined destination, providing high availability of hands free/feet free driving and, at the same time, reducing the complexity of vehicle systems and automated decision making by transferring control to driver at appropriate moments. The recorded route may for example include which lanes to use, where to turn, and even where to park. This reduces the computational burden vs. a fully autonomous driving system, by allowing a human driver to make critical guidance and navigation decisions about the route.

The recorded route can then be played back, allowing the vehicle to retrace the route, using the same lanes, stops, and turns that were initially recorded. In between turns and intersections, during stretches of road with low topological complexity (e.g., following a single stretch of road with no branchings), the vehicle drives autonomously, using the capabilities of a smart cruise control system or assisted driving system (e.g., obstacle avoidance, lane-hold, etc.). However, at locations with higher topological complexity, such as within a threshold distance of turns, stops, intersections, complex merges, etc. (which may collectively be referred to as decision points), the minimal input driving system gradually applies the brakes until the vehicle informs the driver that a handover is imminent and then while waiting for user input, starts slowly decelerating, in that order. Here, the system informs the driver of the handover before it occurs. This offloads still more complexity from the minimal input driving system, as it allows perception and decision making (two of the most demanding tasks in autonomous driving) to be performed by the human driver, rather than by the minimal input driving system itself. In some implementations, the user can override the braking by (for example) tapping the accelerator pedal before the vehicle has come to a complete stop, telling the minimal input driving system that it is safe to continue following the recorded route.

Gradual branchings, such as where the left lane and right lane separate into different roads, may, for the purposes of this disclosure, be treated as having a low topological complexity and therefore not requiring driver intervention. This may for example prevent the vehicle from stopping in the middle of a busy road until the driver authorizes the vehicle to follow its current lane onto the new roadway. Similarly, on-ramps that lead to a dedicated lane may be considered low-topological-complexity roadways, whereas on-ramps that require a merge with moving traffic may be considered to have a high topological complexity and thus require user input to proceed. These distinctions may for example be stored in a global positioning system (GPS) or mapping system accessible to the vehicle, or may be stored as part of the recorded route. Other situations where driver authorization and guidance may be requested generally include any topology where the ego vehicle might have to yield, which may include but is not limited to: all-way stops, any stop or yield signs, merge ramps, lane crossings, and/or pre-recorded lane change locations. To simplify autonomous perception even further, the driver may be asked to provide their input at any traffic light location, independent of the detected traffic light phase or presence of cross traffic or oncoming traffic. Further, this may in some cases be independent of whether or not, during the route-recording process, the recording driver stopped or yielded at such locations.

Thus, the minimal input driving system leverages human perception and judgment in situations of high topological complexity, without requiring the human driver to control the brake, throttle, or steering of the vehicle.

TABLE 1

| Minimal Input Driving System Division of Tasks | | |
|---|---|---|
| Task ↓ | Responsible At Intersections | Everywhere Else |
| Navigation | SYSTEM | SYSTEM |
| Perception | DRIVER | SYSTEM |
| Decision | DRIVER | SYSTEM |
| Control | SYSTEM | SYSTEM |

On simple road segments, the vehicle can stay within the recorded lane, hold its position within the recorded lane, change smoothly from one recorded lane to another recorded lane, travel at the recorded speed (or, alternatively, the speed limit) except where traffic prevents this, and must control the brake, throttle, and steering to avoid collisions with other vehicles. Notably, these functions are similar to those currently performed by many intelligent cruise control systems such as Toyota Safety Sense (TSS).

Because the vehicle does not need to engage in perception or judgment at intersections, it can for example use the same computational and sensing resources currently used for intelligent cruise control (e.g., steering, throttle, and brake control for lane hold and collision avoidance), with the additional functionality of completing turns autonomously. Thus, the minimal input driving system needs to transition smoothly from the recorded lane of one road to the recorded lane of an intersecting road. Although many intelligent cruise control systems do not currently perform this task, the task may be of comparable computational complexity to tasks that are performed by intelligent cruise control systems.

The task load of driving (e.g., simultaneous perception, judgement, and operation), can be cumbersome and challenging for some drivers, and infeasible for others. Thus, the minimal input driving system handles the driving task, almost in its entirety, automatically. Minimal input driving (MID) can help elderly drivers and/or permanently or temporarily disabled drivers get to where they need to be, as well as offing improved mobility and convenience (and perhaps improved safety) to non-impaired drivers who may, for various reasons, want to take their attention off the road at certain times. The MID system takes over navigation, steering, brake, and throttle, everywhere except where the vehicle might have to yield to intersecting/oncoming traffic. The driver is asked to make a go/no-go decision at the right timing at those locations. This makes the minimal input driving system potentially safer and more affordable than other "autopilot" technologies currently available.

Current smart cruise control systems (e.g., Toyota TSS 4/25) may be used generally on highways and very simple non-highway roads, whereas the minimal input driving system, using the same or comparable sensors and computing resources, can be used anywhere. The minimal input driving system is capable of sensing traffic lights, stop signs, and other indications of the possible existence of crossing traffic. This may be done in order to transfer authority to the driver. However, it is possible that detection of such locations can be entirely based on information from a map.

Depending on the implementation, maps and recorded routes may be shareable between users, or may remain private. The system may integrate with other vehicle systems, including but not limited to visual odometry and mapping, lane centering and turning localization and control, cruise control, collision avoidance, lane change support, auto park, remote park, new or existing human-machine interfaces (HMI), and map community exchange markets.

The present disclosure aids substantially in human-machine interaction, by handing over perception and judgment tasks to a human driver when go/no-go decisions need to be made (e.g., turning left, turning right, merging into traffic, crossing an intersection with cross-traffic, etc.). Implemented on one or more processors within the vehicle, the minimal input driving system disclosed herein provides practical, real-time driving, perception, and decision making, plus real-time handover of perception and decision making to the driver as needed. This streamlined autonomous driving capability transforms a sensor-intensive, computationally intensive process of fully autonomous driving into one where the most intensive tasks are handed over to the human driver, without the normally routine need to relinquish control of the vehicle entirely to the driver. This unconventional approach improves the functioning of the vehicle, by allowing drivers to safely enjoy the benefits of autonomous driving at a price-point and complexity comparable to that of smart cruise control systems or assisted driving systems.

The minimal input driving system may be implemented as a combination of hardware and/or software modules, and operated by a control process executing on a processor circuit that accepts user inputs from the vehicle operator, and that is in communication with location services and on-board sensors. In that regard, the control process performs certain specific operations in response to different inputs made at different times. Certain structures, functions, and operations of the processor circuit, sensors, and user input systems are known in the art, while others are recited herein to enable novel features or aspects of the present disclosure with particularity.

These descriptions are provided for exemplary purposes only, and should not be considered to limit the scope of the minimal input driving system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a diagrammatic illustration, in a block diagram form, of a minimal input driving system, in accordance with at least one embodiment of the present disclosure. In an example, a minimal input driving system is referred to by the reference numeral 100 and includes a vehicle (or ego vehicle) 105, such as an automobile, and a vehicle control unit (VCU) 110 located on the vehicle 105. The vehicle 105 may include a front portion 115*a* (including a front bumper), a rear portion 115*b* (including a rear bumper), a right side portion 115*c* (including a right front quarter panel, a right front door, a right rear door, and a right rear quarter panel), a left side portion 115*d* (including a left front quarter panel, a left front door, a left rear door, and a left rear quarter panel), and wheels 115*e*. A communication module 120 may be operably coupled to, and adapted to be in communication with, the vehicle control unit 110. The communication module 120 may be adapted to communicate wirelessly with a central server 125 via a network 130 (e.g., a 3G network, a 4G network, a 5G network, a Wi-Fi network, or the like, including communicating via a combination of one or more or networks). The central server 125 may provide information and services including but not limited to include location, mapping, route or path, and topography information.

An operational equipment engine 140 is operably coupled to, and adapted to be in communication with, the vehicle control unit 110. A sensor engine 150 is operably coupled to, and adapted to be in communication with, the vehicle control unit 110. The sensor engine 150 is adapted to monitor various components of, for example, the operational equipment engine 140. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the minimal input driving system 100.

The term "engine" is meant herein to refer to an agent, instrument, or combination of either, or both, agents and instruments that may be associated to serve a purpose or accomplish a task—agents and instruments may include sensors, actuators, switches, relays, motors or power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125. In some cases, an engine may incorporate or make use of multiple processors or software modules.

In this example, the vehicle 105 also includes a chassis electronic control unit (ECU) 111 which controls elements of the vehicle's suspension system, a brake ECU 112 which controls the braking system or elements thereof, a power train ECU 113 (variously known as an engine ECU, power plant ECU, motor ECU, or transmission ECU) that controls elements of the motor and drivetrain. The system also includes one or more environmental sensors 201, one or more vehicle sensors 202, and a minimal input driving engine 142, the operation of which will be described below.

It is understood that other components or arrangements of components may be found in a vehicle 105, and that at least some of the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

Before continuing, it should be noted that the examples described above are provided for purposes of illustration, and are not intended to be limiting. Other devices and/or device configurations may be utilized to carry out the operations described herein.

Figure 2:
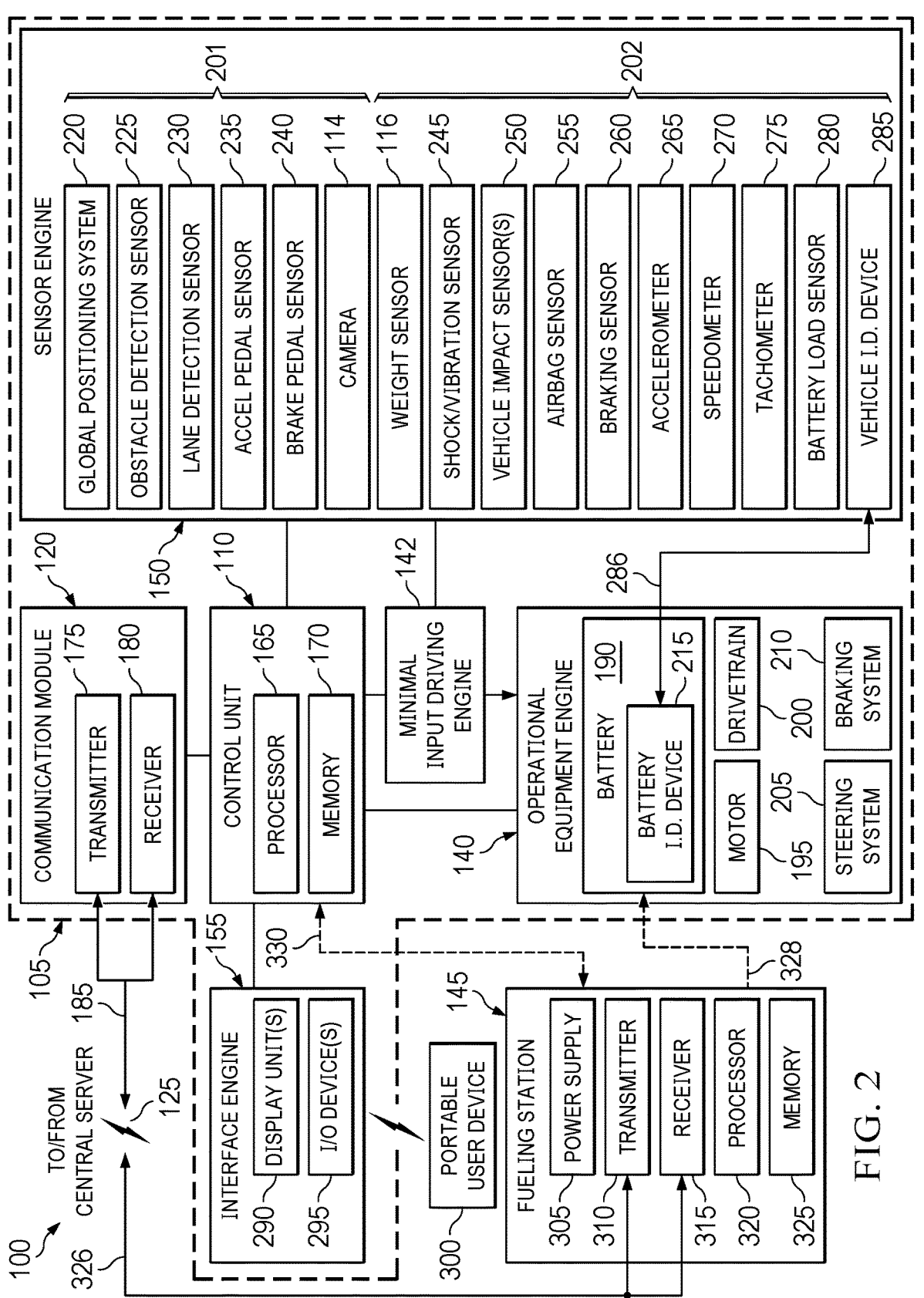
FIG. 2 is a diagrammatic illustration, in a block-diagram form, of at least a portion of the minimal input driving system of FIG. 1, in accordance with at least one embodiment of the present disclosure.

FIG. 2 is a diagrammatic illustration, in a block-diagram form, of at least a portion of the minimal input driving system 100 of FIG. 1, in accordance with at least one embodiment of the present disclosure. It is noted that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain or transmission 200, a steering system 205, and a braking system 210. In some vehicles, the vehicle battery 190 may provide electrical power to the motor 195 to drive the wheels 115*e* of the vehicle 105 via the drivetrain 200. In some examples, the motor 195 is an internal combustion motor and the battery operates a starter of the motor 195.

In some examples, instead of or in addition to providing power to the motor 195, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system (GPS) or other positioning sensor 220 (e.g., GLONASS, Galileo, LORAN, WiFi triangulation, radio broadcast tower triangulation, or cell tower triangulation system, etc.). The sensor engine 150 may also include one or more obstacle detection sensors 225 (e.g., one or more cameras, lidars, radars, proximity sensors, or other sensors) configured to detect obstacles in the path of the vehicle. The sensor engine 150 may also include one or more lane detection sensors 230 (e.g., one or more cameras, radars, lidars, or other sensors) configured to detect lane markings and thus the position of the vehicle within a lane. The sensor engine 150 may also include an acceleration pedal deflection sensor 235 and brake pedal deflection sensor 240. In some implementations, the obstacle detection sensor(s) 225, lane detection sensor(s) 230, acceleration pedal deflection sensor 235, and brake pedal deflection sensor 240 are used as inputs to an intelligent cruise control system such as TSS, which is capable of controlling the steering, brake, and accelerator of the vehicle. In other implementations, the obstacle detection sensor(s) 225, lane detection sensor(s) 230, acceleration pedal deflection sensor 235, and brake pedal deflection sensor 240 can be used instead or in addition as inputs to the minimal input driving engine 142, which is also capable of controlling the steering, brake, and accelerator of the vehicle. The sensor engine 150 may also include a shock/vibration sensor 245, a vehicle impact sensor 250, an airbag sensor 255, a braking sensor 260, an accelerometer or acceleration sensor 265, a speedometer 270, a tachometer 275, a battery load sensor 280, a vehicle identification device 285, a forward-looking 2D or 3D camera 114, a weight sensor 116, or any combinations thereof. The sensors or other detection devices may be configured to sense or detect activity, conditions, and circumstances in an area to which the device has access, e.g., conditions inside or outside the vehicle cabin, engine compartment, battery, or fuel tank. Sub-components of the sensor engine 150 may be deployed at any operational area where information on the driving of the vehicle 105 may occur. Readings from the sensor engine 150 may be fed back to the vehicle control unit 110, brake ECU 112, power train ECU or hybrid ECU 113, and/or minimal input driving engine 142. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110 or brake ECU 112. The accelerometer 265 is adapted to monitor acceleration of the vehicle 105 and to communicate the acceleration information to the vehicle control unit 110, hybrid ECU/power train ECU 113, or minimal input driving engine 142. The accelerometer 265 may be, for example, a two-axis accelerometer 265 or a three-axis accelerometer 265. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110 and/or the minimal input driving engine 142. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed or angular velocity (e.g., in revolutions-per-minute) of the vehicle 105's motor 195 and to communicate the angular velocity information to the vehicle control unit 110 and/or the minimal input driving engine 142. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 may be adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which may be operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a touch-screen display unit, soft keys associated with a dashboard or head unit, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device (e.g., a smartphone or tablet computer) which is carried onto the vehicle 105 by a user who is a driver or a passenger on the vehicle 105, or proximate to the vehicle. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated.

Also visible is a vehicle fueling station 145, which supplies fuel or electrical energy 328 to the operational equipment engine 140, and may include such components as a power supply 305, transmitter 310, receiver 315, processor 320, and memory 325.

The minimal input driving system 100 also includes a minimal input driving engine 142, the operation of which will be described below. In some embodiments, the minimal input driving engine 142 comprises a standalone housing with its own processor and memory. In other embodiments, the minimal input driving engine 142 exists as software, firmware, or hardware within another processor, such as the vehicle control unit 110, operational equipment engine 140, brake ECU 112, or power train ECU/hybrid ECU 113. The sensor engine 150 includes environmental sensors 201 and vehicle sensors 202.

It is understood that other components or arrangements of components may be found in a vehicle 105, and that the same general principles apply to electric vehicles, internal combustion vehicles, and hybrid vehicles.

Figure 3:
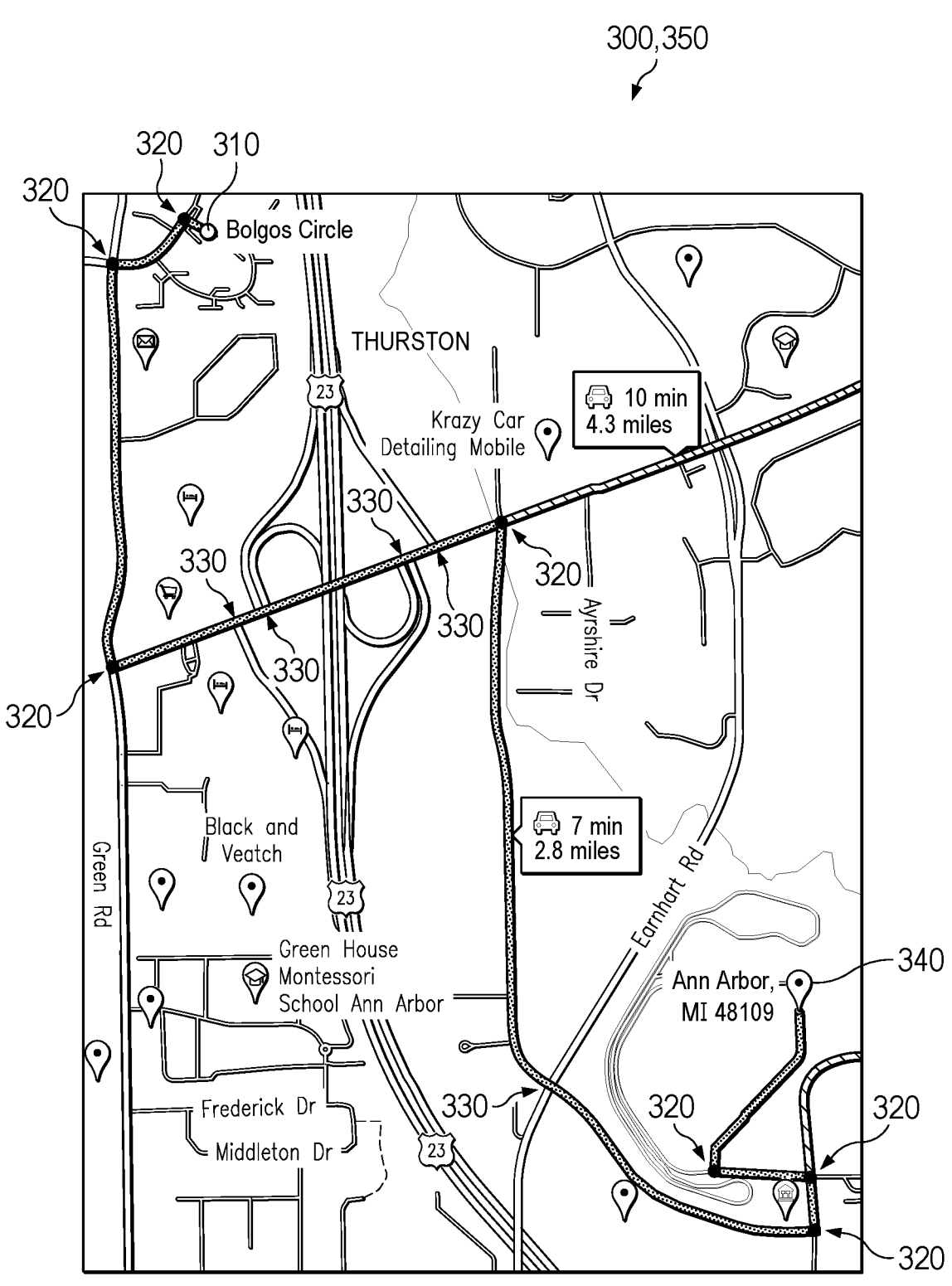
FIG. 3 is a visual representation, in map form, of an example recorded route 350, in accordance with at least one embodiment of the present disclosure.

FIG. 3 is a visual representation 300, in map form, of an example recorded route 350, in accordance with at least one embodiment of the present disclosure. In an example, a skilled driver may drive from a starting point 310 such as a house or apartment building to a destination 340, such as a store, workplace, or service provider. During the drive, the minimal input driving system records the position of the vehicle (e.g., as measured by the GPS 220 of FIG. 2), the speed of the vehicle (e.g., as measured by the speedometer 270 and/or GPS 220 of FIG. 2), and the lane and position-within-lane of the vehicle (e.g., as measured by the lane detection sensor 230 of FIG. 2). The recording may occur continuously or intermittently, such as every second, every 100 milliseconds, etc. During the drive, the vehicle makes a number of turns 320 and passes a number of intersections 330.

Once the route has been recorded, the skilled driver may return the vehicle to the starting point 310, after which the skilled driver or an unskilled driver can activate the minimal input driving system in order to follow the route with minimal driving input. For example, the minimal input driving system (e.g., via the minimal input driving engine 142 of FIG. 2, or via existing smart cruise control capabilities present in the vehicle) controls the brake, throttle, and steering of the vehicle in order to reproduce the positions, speeds, lanes, and positions-in-lane of the recorded route, except where traffic prevents this (e.g., the minimal input driving system detects a possible collision using the obstacle detection sensor 225 that it should avoid using obstacle avoidance logic already present in the vehicle). In response to traffic, the minimal input driving system can implement smart cruise control features of the vehicle to control the brake, throttle, and steering in order to avoid collisions with other vehicles.

At turns, or at intersections where the recorded route includes a stop, the minimal input driving system may first ask the driver to take longitudinal control of the vehicle motion by braking or accelerating along the trajectory, and if the driver does not respond within a certain amount of time, the system may slow down and stop the, e.g., by braking until the velocity of the vehicle is zero. Depending on the implementation, the driver might be expected to completely control the longitudinal motion of the vehicle along the pre-recorded path or in some instance approve a "go/stop" decision by tapping on the accelerator or brake pedal. Depending on the implementation, the minimal input driving system may also slow down and (upon no reaction from the driver) stop the vehicle at all-way stops, regular yields/stops, traffic lights of any phase, merge ramps, lane crossings, etc. During playback, when the vehicle is stopped, the minimal input driving system will not start the vehicle moving again until it receives an input from the driver (e.g., tapping the accelerator pedal). When the vehicle is stopped, the driver's job is to look around, provide situational awareness and judgment, and determine when it is safe for the vehicle to proceed (e.g., when no other vehicles will be crossing the intended path of the ego vehicle). Once the driver input is received, the minimal input driving system will accelerate the vehicle again and resume following the recorded route as described above. For example, the controls the vehicle to reproduce the positions, velocities, lanes, and positions-in-lane of the recorded route, until the next stop occurs. Depending on the implementation, the recorded route may include a particular parking space at the destination 340. In such cases, the minimal input driving system may activate or integrate with autopark capabilities of the ego vehicle.

It is noted that turning is not a function of many current smart cruise control systems. Rather, in some implementations, the capability to turn from a particular lane on a given road to a different particular lane on a crossing road is a capability of the minimal input driving system itself.

Figure 4:
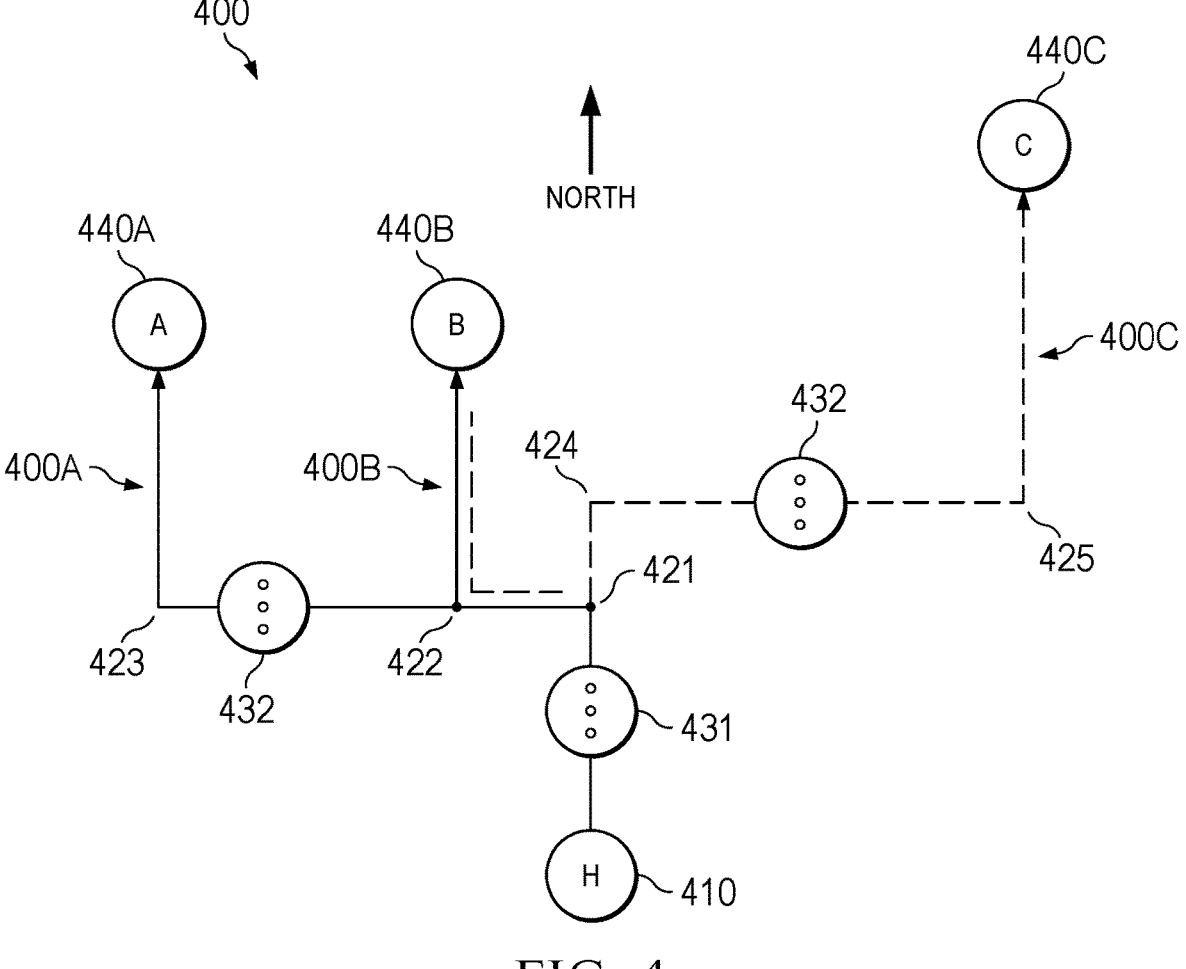
FIG. 4 is a visual representation of two recorded routes, in accordance with at least one embodiment of the present disclosure.

FIG. 4 is a visual representation 400 of two recorded routes, 400A and 400B, in accordance with at least one embodiment of the present disclosure. In an example, both route 400A and route 400B may be stored in the minimal input driving system of a vehicle.

To follow route 400A, the minimal input driving system, beginning at the home location 410, controls the vehicle to travel north until it encounters an intersection 431. If the intersection 431 includes a red traffic light, a stop sign, or an uncontrolled crossing (e.g., no traffic light or stop sign in either direction-information that may for example be available from the GPS, or may be stored as part of the recorded route), the minimal input driving system will request driver input, as described above. Once the driver input is received, indicating that it is safe for the vehicle to proceed, the minimal input driving system controls the vehicle to drive north along the recorded route 400A until it reaches a turn 421. Because the turn 421 includes the possibility of vehicles turning left across the path of the ego vehicle, the minimal input driving system requests user input. Once the user input is received, the minimal input driving system controls the vehicle to complete the turn and then travel west until it reaches an uncontrolled intersection 422, at which point the minimal input driving system continues along the route. In another implementation the minimal input driving system requests the driver to completely control the longitudinal acceleration or braking along the turn. The minimal input driving system then controls the vehicle to travel west, until it reaches intersection 432, where it again requests user input. Once the driver provides input through the intersection, the minimal input driving system then controls the vehicle to travel west until it reaches a turn 423. The minimal input driving system requests driver input, then turns and proceeds north until it reaches its destination 440A. Depending on the implementation, the minimal input driving system may then control the vehicle to autopark, may use assisted parking, or may rely on the driver to park the vehicle.

Following route 400B involves a similar process to that for route 400A.

A third route 400C has been recorded by a different vehicle, and may for example be available through a shared or public database or exchange of recorded routes. Route 400C begins at the destination 440B of route 400B and ends at destination 440C. Because route 400C intersects routes 400A and 400B, the minimal input driving system can, in some implementations, create a new route using portions of route 400A or 400B and portions of route 400C.

Figure 5:
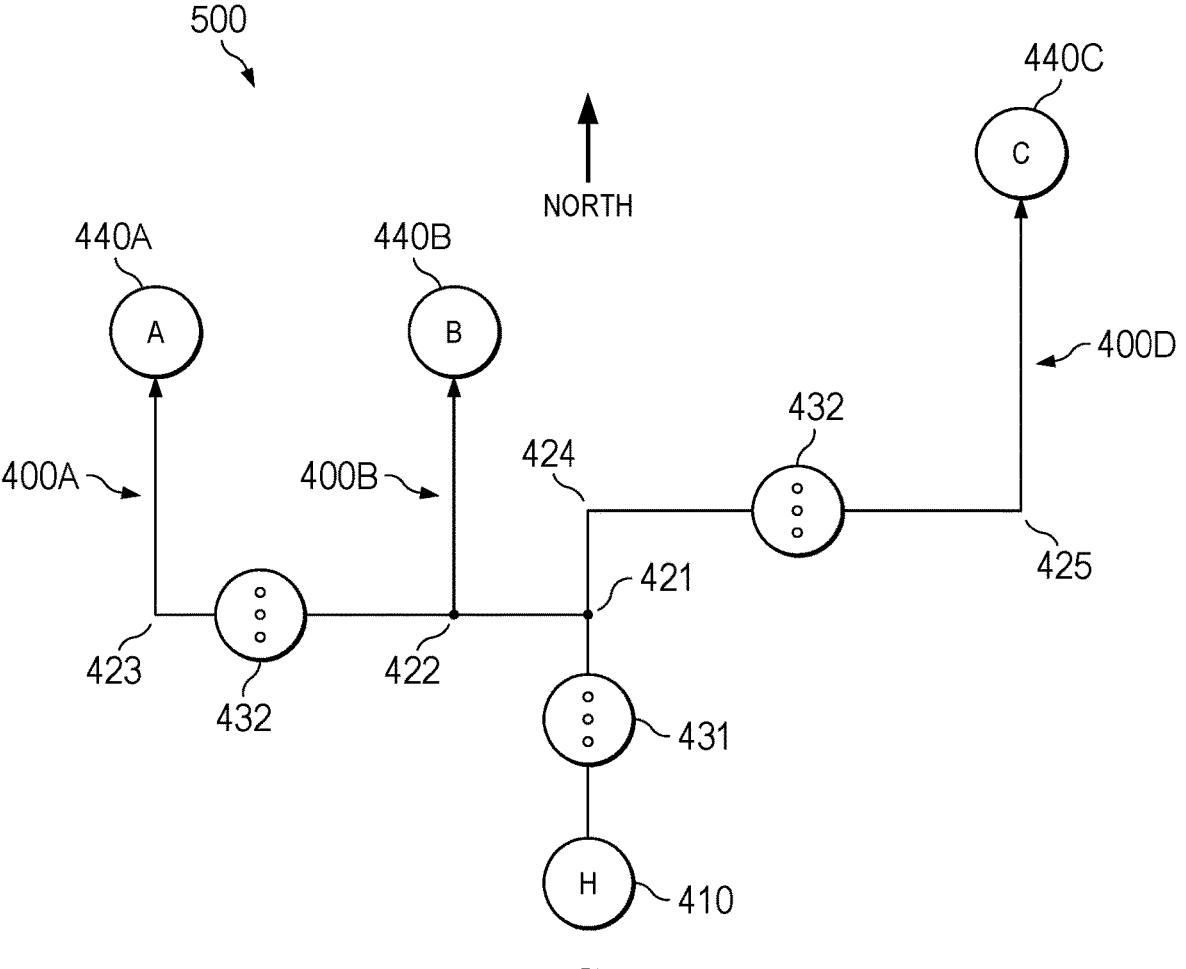
FIG. 5 is a visual representation of the two recorded routes of FIG. 4, in accordance with at least one embodiment of the present disclosure.

FIG. 5 is a visual representation 500 of the two recorded routes 400A and 400B of FIG. 4, in accordance with at least one embodiment of the present disclosure. On the example shown in FIG. 5, the minimal input driving system has used portions of route 400A or 400B and portions of route 400C to assemble a new recorded route, 400D, that goes from starting point 410 to destination 440C. The route 400D may now be stored and used along with recorded routes 400A and 400B.

Figure 6:
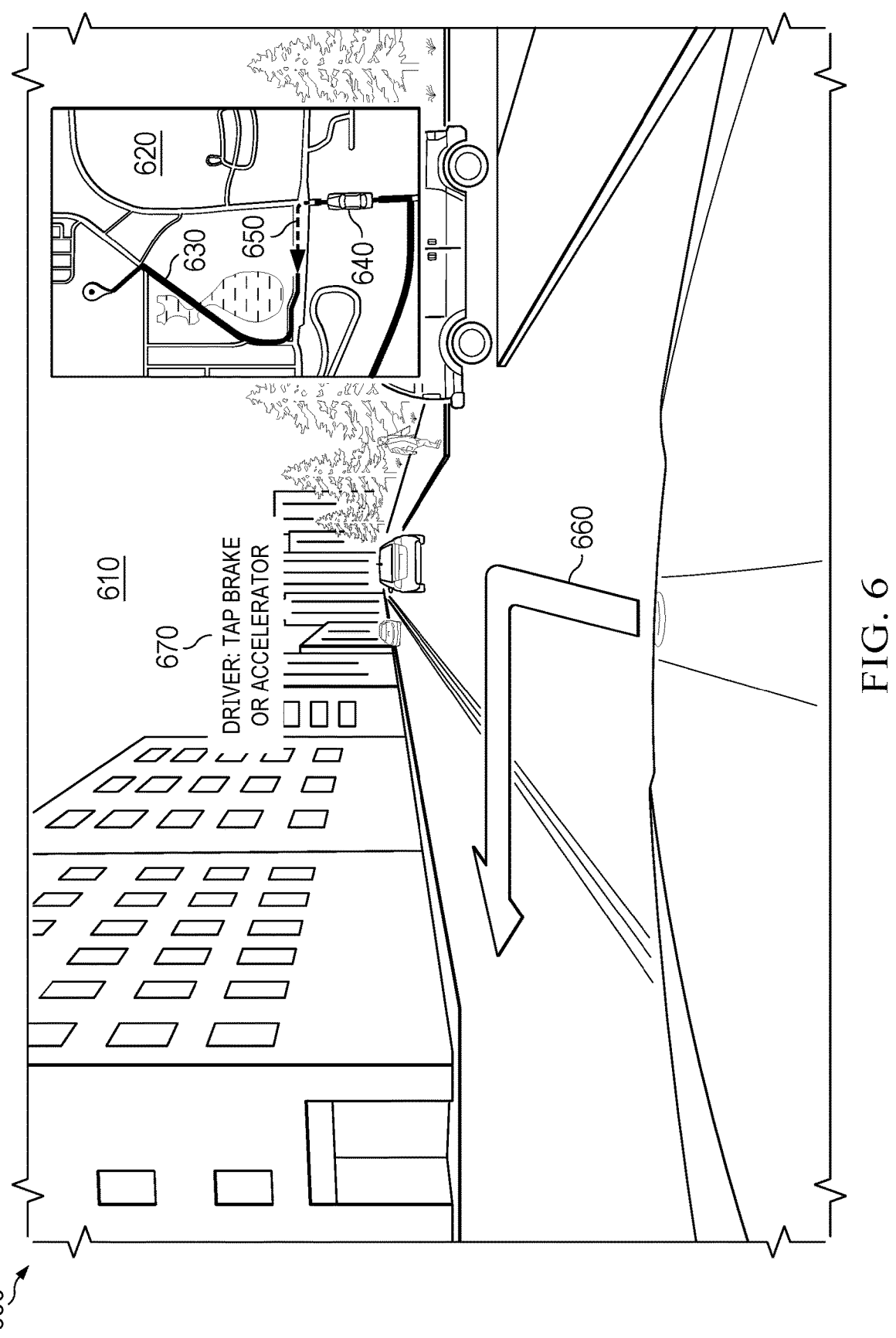
FIG. 6 is a screen display of an example minimal input driving system, in accordance with at least one embodiment of the present disclosure.

FIG. 6 is a screen display 600 of an example minimal input driving system, in accordance with at least one embodiment of the present disclosure. In the example shown in FIG. 6, the screen display 600 includes a front camera view 610 and a map view 620. Superimposed on the front camera view 610 is a route marker 660, which indicates where the vehicle will go. The route marker 660 may for example be an arrow pointing straight ahead, an arrow turning left (as shown), an arrow turning right, a tracing of the entire route or a portion thereof, or other similar indication of the planned path of the vehicle.

In the example shown in FIG. 6, the map view 620 shows a map of the recorded route. The map view 620 also includes a path plan 630 showing all or a portion of the recorded route, a representation 640 of the ego vehicle on the route, and a route marker 650 that, similar to the route marker 660, shows an upcoming action of the vehicle (whether an indication of a left turn, right turn, go straight, or otherwise). Also visible is a driver instruction 670, indicating that the driver should tap the brake (to indicate that the vehicle should stop) or accelerator (to indicate that the vehicle should proceed with the indicated action (which, in the example shown in FIG. 6, is a left turn). Other screen displays or types of screen displays may be used instead or in addition, without departing from the spirit of the present disclosure. In some implementations, the instruction to the driver may be delivered verbally, with displayed symbols, or otherwise.

Figure 7:
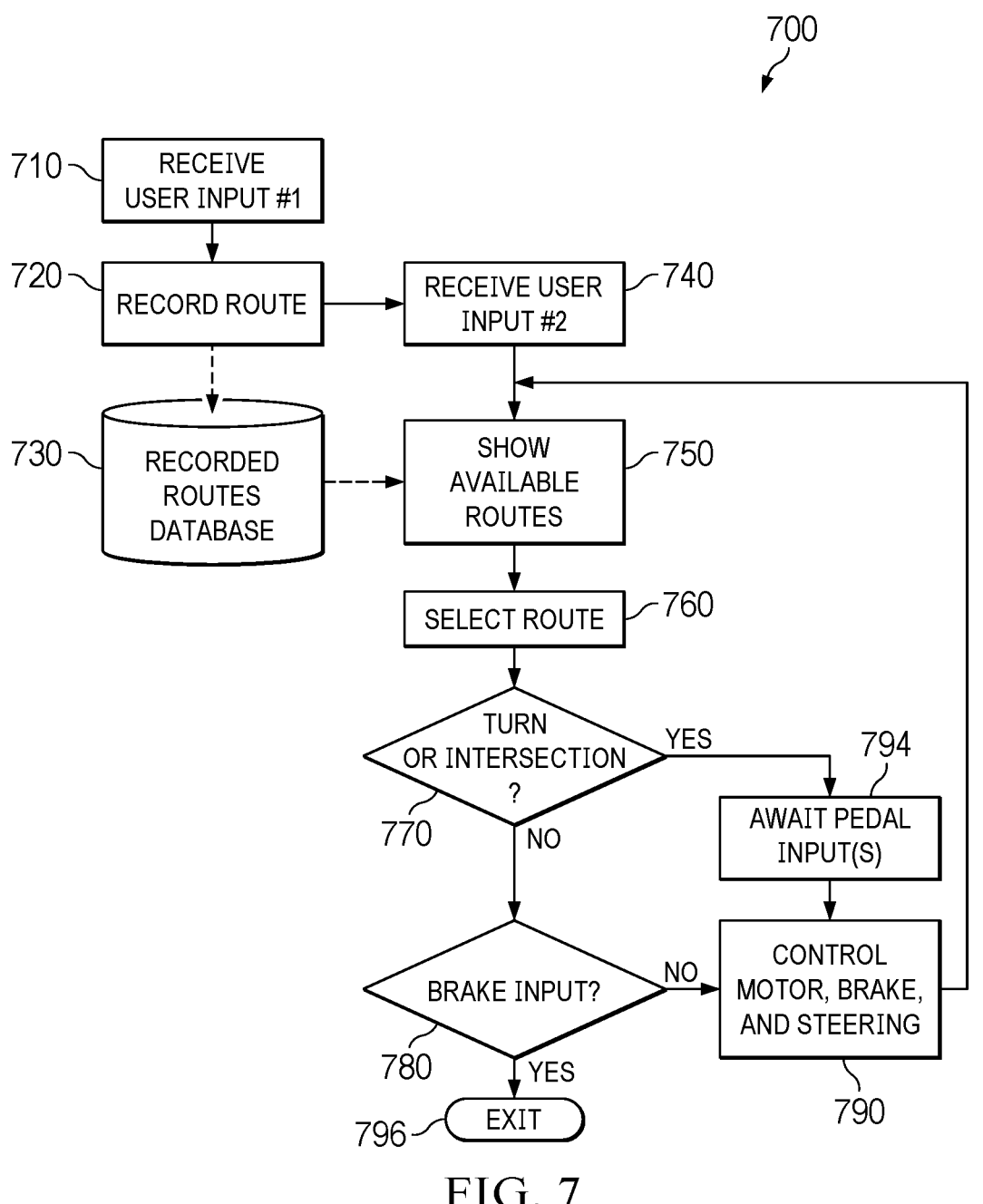
FIG. 7 is a flow diagram of an example minimal input driving method, in accordance with at least one embodiment of the present disclosure.

FIG. 7 is a flow diagram of an example minimal input driving method 700, in accordance with at least one embodiment of the present disclosure. It is understood that the steps of method 700 may be performed in a different order than shown in FIG. 7, additional steps can be provided before, during, and after the steps, and/or some of the steps described can be replaced or eliminated in other embodiments. One or more of steps of the method 700 can be carried by one or more devices and/or systems described herein, such as components of the minimal input driving engine 142, vehicle control unit 110, and/or processor circuit 950.

In step 710, the method 700 includes receiving a user input to record a new route. Execution then proceeds to step 720.

In step 720, the method 700 includes recording the new route, as described above in FIG. 3. Once the route has been recorded, it can be stored in a recorded routes database 730 (whether onboard the vehicle or remote from the vehicle). Execution then proceeds to step 740.

In step 740, the method 700 includes receiving a user input to follow a recorded route. Execution then proceeds to step 750.

In step 750, the method 700 includes displaying or otherwise communicating to the user a list of the available recorded routes. If the vehicle is already following a recorded route, then the list of available routes may be limited to the routes that include the vehicle's current position. Execution then proceeds to step 760.

In step 760, the method 700 includes receiving a user input selecting one of the available recorded routes. Execution then proceeds to step 770.

In step 770, the method 700 includes determining whether to request driver input for the longitudinal control of the vehicle. For example, the vehicle may request driver input when approaching a scheduled left or right turn, a lane change, a traffic light, a stop sign or yield sign, a pedestrian or railway crossing, a roundabout, a merge, or other similar.

If one of these conditions is true, the vehicle requests driver input and execution proceeds to step 794. If none of these conditions are true, then execution proceeds to step 780.

In step 794, the method 700 includes waiting for an accelerator pedal input from the user. When the accelerator pedal input is received, execution then proceeds to step 790.

In step 780, the method 700 includes determining whether the user has depressed the brake pedal. If yes, execution proceeds to step 796. If no, execution proceeds to step 790.

In step 790, the method 700 includes controlling the motor, braking system, and steering system of the vehicle to follow the recorded route, while avoiding obstacles, for a time step of a given duration (e.g., 10 milliseconds). Execution then returns to step 750. In step 796, the method 700 is complete.

However, in some implementations, if the brake pedal is depressed by the user, the vehicle is braked normally under control of the brake pedal, after which the minimal input driving system resumes control. Thus, in some implementations, in step 796, the method 700 includes returning to step 780. In other implementations, single-pedal driving might also be allowed, wherein releasing the accelerator pedal results in braking.

Flow diagrams are provided herein for exemplary purposes; a person of ordinary skill in the art will recognize myriad variations that nonetheless fall within the scope of the present disclosure. For example, the logic of flow diagrams may be shown as sequential. However, similar logic could be parallel, massively parallel, object oriented, real-time, event-driven, cellular automaton, or otherwise, while accomplishing the same or similar functions. In order to perform the methods described herein, a processor may divide each of the steps described herein into a plurality of machine instructions, and may execute these instructions at the rate of several hundred, several thousand, several million, or several billion per second, in a single processor or across a plurality of processors. Such rapid execution may be necessary in order to execute the method in real time or near-real time as described herein.

For example, in order to safely operate the brake, throttle, and steering of the vehicle at driving speed, the minimal input driving system may need to operate at a speed of 10 Hz or greater, and preferably at a speed of 100 Hz or greater.

Figure 8:
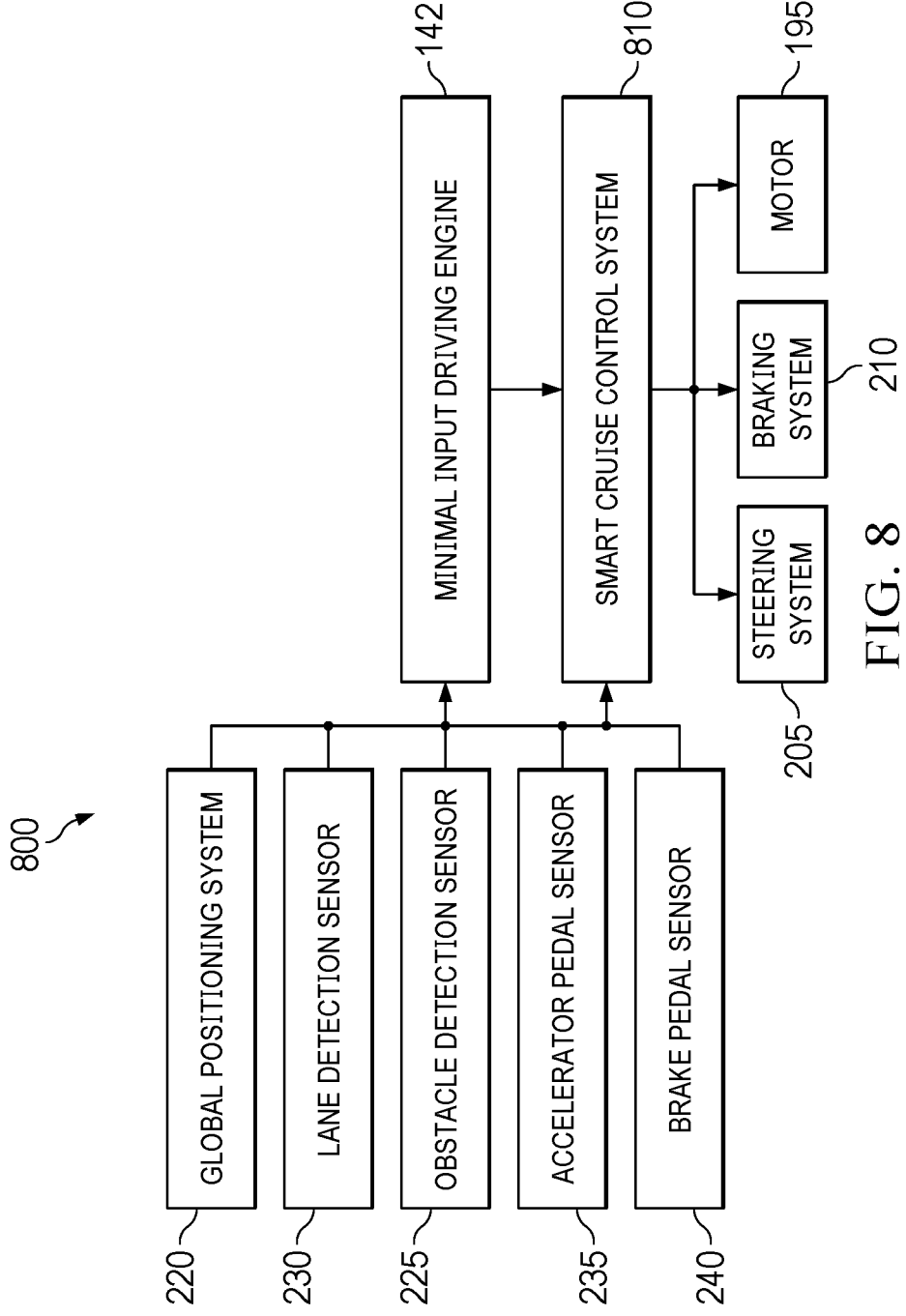
FIG. 8 is a system diagram, in block diagram form, of at least a portion of an example minimal input driving system, in accordance with at least one embodiment of the present disclosure.

FIG. 8 is a system diagram 800, in block diagram form, of at least a portion of an example minimal input driving system, in accordance with at least one embodiment of the present disclosure. The minimal input driving engine 142 and the smart cruise control system or assisted driving system 810 each receive inputs from the GPS 220, lane detection sensor 230, obstacle detection sensor 225, accelerator pedal sensor 235, and brake pedal sensor 240. The minimal input driving engine 142 can activate the smart cruise control system 810 on stretches of low-complexity road, and deactivate the smart cruise control system 810 in high-complexity areas such as at intersections. The smart cruise control system 810 is capable of controlling the steering system 205, braking system 210, and motor 195 (e.g., the throttle or accelerator of the motor 195) in order to follow a recorded route.

Figure 9:
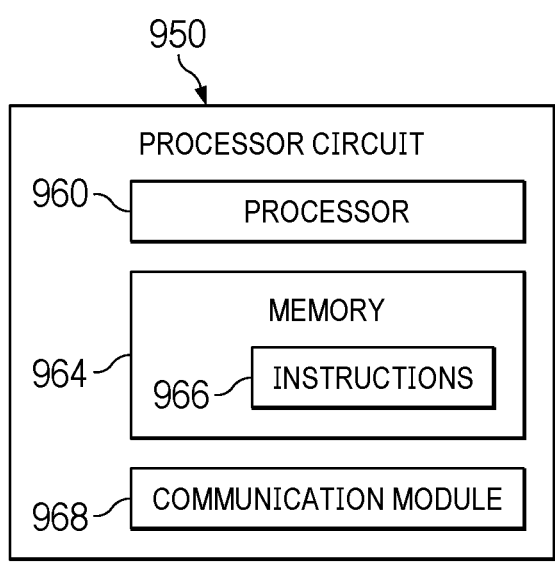
FIG. 9 is a diagrammatic illustration, in a block-diagram form, of a processor circuit, in accordance with at least one embodiment of the present disclosure.

FIG. 9 is a schematic diagram of a processor circuit 950, in accordance with at least one embodiment of the present disclosure. The processor circuit 950 may be implemented in the minimal input driving engine 142 or VCU 110 of FIGS. 1 and 2, the portable device 300 of FIG. 2, or in other devices or workstations (e.g., third-party workstations, network routers, etc.), or on a cloud processor or other remote processing unit, as necessary to implement the method. As shown, the processor circuit 950 may include a processor 960, a memory 964, and a communication module 968. These elements may be in direct or indirect communication with each other, for example via one or more buses.

The processor 960 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 960 may also comprise another hardware device, a firmware device, or any combination thereof configured to perform the operations described herein. The processor 960 may also be implemented as a combination of computing devices, e.g., a combination of a DSP and a microprocessor, a plurality of microprocessors, one or more microprocessors in conjunction with a DSP core, or any other such configuration.

The memory 964 may include a cache memory (e.g., a cache memory of the processor 960), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 964 includes a non-transitory computer-readable medium. The memory 964 may store instructions 966. The instructions 966 may include instructions that, when executed by the processor 960, cause the processor 960 to perform the operations described herein. Instructions 966 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 968 can include any electronic circuitry and/or logic circuitry to facilitate direct or indirect communication of data between the processor circuit 950, and other processors or devices. In that regard, the communication module 968 can be an input/output (I/O) device. In some instances, the communication module 968 facilitates direct or indirect communication between various elements of the processor circuit 950 and/or the minimal input driving system 100. The communication module 968 may communicate within the processor circuit 950 through numerous methods or protocols. Serial communication protocols may include but are not limited to US SPI, I²C, RS-232, RS-485, CAN, Ethernet, ARINC 429, MODBUS, MIL-STD-1553, or any other suitable method or protocol. Parallel protocols include but are not limited to ISA, ATA, SCSI, PCI, IEEE-488, IEEE-1284, and other suitable protocols. Where appropriate, serial and parallel communications may be bridged by a UART, USART, or other appropriate subsystem.

External communication (including but not limited to software updates, firmware updates, preset sharing between the processor and central server, or readings from the sensors may be accomplished using any suitable wireless or wired communication technology, e.g., a cable interface such as a USB, micro USB, Lightning, or Fire Wire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

As will be readily appreciated by those having ordinary skill in the art after becoming familiar with the teachings herein, the minimal input driving system advantageously provides an autonomous driving capability to a vehicle equipped with assistive driving sensors and processors, without requiring the more advanced, more expensive sensors, processors, and algorithms required to generate situational awareness and judgment in situations where other vehicles (as well as pedestrians, wildlife, etc.) may cross the path of the ego vehicle. Accordingly, when compared to existing assistive driving systems such as Toyota Safety Sense (TSS), the minimal input driving system 100 is more robust, more capable, and provides greater value to the consumer. Depending on the implementation, a number of variations are possible on the examples and embodiments described above. For example, the technology may be applied to different vehicle types, including, three-wheeled vehicles, multi-wheeled vehicles, internal combustion vehicles, electric vehicles, and hybrid vehicles. Other variables and other logical or arithmetic operations may be employed than those described above, in order to provide the same or similar functions.

The logical operations making up the embodiments of the technology described herein are referred to variously as operations, steps, objects, elements, components, layers, or modules. It should be understood that these may occur or be performed or arranged in any order, unless explicitly claimed otherwise or a specific order is inherently necessitated by the claim language. All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the minimal input driving system or its components. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide an enabling description of the structure and use of exemplary embodiments of the minimal input driving system as defined in the claims. Although various embodiments of the claimed subject matter have been described above with a certain degree of particularity, or with reference to one or more individual embodiments, those skilled in the art would understand that numerous alterations to the disclosed embodiments are contemplated without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system for controlling a vehicle, the system comprising:
    a positioning sensor;
    an obstacle detection sensor;
    a lane detection sensor;
    a smart cruise control system configured to control steering, braking, and acceleration of the vehicle, based on sensor readings from the positioning sensor, the obstacle detection sensor, and the lane detection sensor;
    a processor configured to:
        with the positioning sensor, obstacle detection sensor, and lane detection sensor, record a route while a driver is controlling the steering, braking, and acceleration of the vehicle;
        receive a first user input to follow the recorded route;
        for a first complexity of a roadway on which the vehicle is traveling, activate the smart cruise control system to follow the recorded route; and
        for a second complexity of the roadway on which the vehicle is traveling:
            deactivate the smart cruise control system;
            control the braking of the vehicle;
            receive a second user input; and
            upon receiving the second user input, activate the smart cruise control system to follow the recorded route.

2. The system of claim 1, wherein the first complexity comprises an absence of a stop, turn, merge, or intersection within a threshold distance, and wherein the second complexity comprises a presence of a stop, turn, merge, or intersection within the threshold distance.

3. The system of claim 1, wherein the obstacle detection sensor comprises a radar, lidar, or camera.

4. The system of claim 1, wherein the lane detection sensor comprises a radar, lidar, or camera.

5. The system of claim 1, wherein following the recorded route comprises:
    with the obstacle sensor, detecting an obstacle; and
    controlling the steering, braking, and acceleration of the vehicle to avoid the obstacle.

6. The system of claim 1, wherein the processor is further configured to generate a screen display comprising a representation of at least a portion of the recorded route.

7. The system of claim 1, wherein the processor is further configured to:
    receive a brake pedal user input; and
    upon receiving the brake pedal user input, deactivate the smart cruise control system.

8. The system of claim 1, wherein following the recorded route comprises making at least one turn or lane change.

9. The system of claim 1, wherein following the recorded route comprises parking the vehicle.

10. The system of claim 1, wherein the processor is further configured to combine a first portion of the recorded route with a second portion of a second recorded route to produce a third recorded route.

11. A method for controlling a vehicle, the method comprising:

with a smart cruise control system, controlling steering, braking, and acceleration of the vehicle, based on sensor readings from a positioning sensor, an obstacle detection sensor, and a lane detection sensor;

with a processor:

with the positioning sensor, obstacle detection sensor, and lane detection sensor, recording a route while a driver is controlling the steering, braking, and acceleration of the vehicle;

receiving a first user input to follow the recorded route;

for a first complexity of a roadway on which the vehicle is traveling, activating the smart cruise control system to follow the recorded route; and for a second complexity of the roadway on which the vehicle is traveling:

deactivating the smart cruise control system;

controlling the braking of the vehicle;

receiving a second user input; and upon receiving the second user input, activating the smart cruise control system to follow the recorded route.

12. The method of claim 11, wherein the first complexity comprises an absence of a stop, turn, merge, or intersection within a threshold distance, and wherein the second complexity comprises a presence of a stop, turn, merge, or intersection within the threshold distance.

13. The method of claim 11, wherein the obstacle detection sensor or the lane detection sensor comprises a radar, lidar, or camera.

14. The method of claim 11, wherein following the recorded route comprises:

with the obstacle sensor, detecting an obstacle; and controlling the steering, braking, and acceleration of the vehicle to avoid the obstacle.

15. The method of claim 11, further comprising, with the processor, generating a screen display comprising a representation of at least a portion of the recorded route.

16. The method of claim 11, further comprising, with the processor:

receiving a brake pedal user input; and upon receiving the brake pedal user input, deactivating the smart cruise control system.

17. A system for controlling a vehicle, the system comprising:

a positioning sensor;

an obstacle detection sensor;

a lane detection sensor;

a smart cruise control system configured to control steering, braking, and acceleration of the vehicle, based on sensor readings from the positioning sensor, the obstacle detection sensor, and the lane detection sensor;

a processor configured to:

with the positioning sensor, obstacle detection sensor, and lane detection sensor, record a route while a driver is controlling the steering, braking, and acceleration of the vehicle;

receive a first user input to follow the recorded route;

for a first complexity of a roadway on which the vehicle is traveling, activate the smart cruise control system to follow the recorded route; and for a second complexity of the roadway on which the vehicle is traveling, requesting a driver to control at least one of the steering, braking or acceleration of the vehicle, wherein the second complexity is higher than the first complexity.

18. The system of claim 17, wherein the processor is further configured to, for the second complexity of the roadway on which the vehicle is traveling:

control the braking of the vehicle;

receive a second user input; and upon receiving the second user input, activate the smart cruise control system to follow the recorded route.

19. The system of claim 17, wherein, for the first complexity of the roadway, the smart cruise control system controls steering, acceleration and braking of the vehicle.

20. The system of claim 17, wherein, for the second complexity of the roadway, the smart cruise control system controls steering of the vehicle and instructs the user to control the acceleration and braking of the vehicle.

* * * * *